(12) United States Patent
Panikkar et al.

(10) Patent No.: US 12,487,878 B2
(45) Date of Patent: Dec. 2, 2025

(54) APPLICATION ASSISTANT FOR MANAGING APPLICATION PROGRAMS IN AN INFORMATION PROCESSING SYSTEM

(71) Applicant: Dell Products L.P., Round Rock, TX (US)

(72) Inventors: Shibi Panikkar, Bangalore (IN); Chakradhar Kommana, Katy, TX (US)

(73) Assignee: Dell Products L.P., Round Rock, TX (US)

( * ) Notice: Subject to any disclaimer, the term of this patent is extended or adjusted under 35 U.S.C. 154(b) by 107 days.

(21) Appl. No.: 18/474,344

(22) Filed: Sep. 26, 2023

(65) Prior Publication Data

US 2025/0103421 A1 Mar. 27, 2025

(51) Int. Cl.
*G06F 11/00* (2006.01)
*G06F 11/07* (2006.01)
*G06F 11/3668* (2025.01)

(52) U.S. Cl.
CPC ........ *G06F 11/079* (2013.01); *G06F 11/0772* (2013.01); *G06F 11/0793* (2013.01); *G06F 11/3688* (2013.01)

(58) Field of Classification Search
CPC ............... G06F 11/0772; G06F 11/079; G06F 11/0793; G06F 11/3688
See application file for complete search history.

(56) References Cited

U.S. PATENT DOCUMENTS

| | | | |
|---|---|---|---|
| 7,539,977 B1 * | 5/2009 | Bloom | G06F 11/3604 717/124 |
| 11,640,349 B2 * | 5/2023 | Ho | G06F 11/3476 717/135 |
| 11,983,094 B2 * | 5/2024 | Downie | G06F 11/3698 |
| 2014/0372963 A1 * | 12/2014 | Chandaria | G06F 8/00 717/100 |
| 2018/0062867 A1 * | 3/2018 | Peshkar | G01N 33/5005 |
| 2018/0157550 A1 * | 6/2018 | Ivanov | H04L 41/122 |
| 2024/0264894 A1 * | 8/2024 | Napa | G06F 11/0709 |
| 2024/0281316 A1 * | 8/2024 | Revanna | G06F 11/0793 |

OTHER PUBLICATIONS

P. Yee, "Self-Healing Testing using Deep Learning Algorithms," https://medium.com/dbs-tech-blog/self-healing-testing-using-deep-learning-algorithms-506bbbde9cd4, Jul. 6, 2021, 21 pages.

I. Sacolick, "What is CI/CD? Continuous integration and Continuous Delivery Explained," https://www.infoworld.com/article/3271126/what-is-cicd-continuous-integration-and-continuous-delivery-explained.html, Apr. 15, 2022, 9 pages.

* cited by examiner

*Primary Examiner* — Joshua P Lottich (74) *Attorney, Agent, or Firm* — Ryan, Mason & Lewis, LLP (57) ABSTRACT

Application program management techniques in an information processing system environment are disclosed. For example, a method comprises assessing an issue with an execution of a first application, by a second application, wherein the second application operates in association with the first application and comprises a reduced code set of the first application, and wherein the issue is assessed by the second application at least in part based on an artificial intelligence model trained on a context of the first application. The method further comprises generating, by the second application, a remedy for the issue based on the assessing.

20 Claims, 9 Drawing Sheets

| ContextID | TypeOfError | CodeGenerationHint |
|---|---|---|
| XXXXX | NullPointerexception | CheckForNull & continue |

```
License RemoveFeatureFromLicense (License l, Feature f){
    License newLicense = new License(l);
    newLicense.removeFeature(f);
}
```
506

FIG. 5C

```
Class LicenseManager {
    License AddFeatureToLicense (License l, Feature f){
        return null;
    }
    License RemoveFeatureFromLicense (License l, Feature f){
        License newLicense = new License(l);
        //below code is system inserted as per code suggestion
        if(newLicense == null){
            newLicense.removeFeature(f);
        }
        //below code is system inserted as per code suggestion
        return newLicense;
    }
    License InvalidateLicense (License l){
        return null;
    }
    License SignLicense (License l){
        return null;
    }
}
```
508

FIG. 5D

```
License RemoveFeatureFromLicense (License l, Feature f){
    License newLicense = new License(l);
    //below code is system inserted as per code suggestion
    if(newLicense != null){
        newLicense.removeFeature (f);
        return newLicense;
    }else{
        return null;
    }
}
```

APPLICATION ASSISTANT FOR MANAGING APPLICATION PROGRAMS IN AN INFORMATION PROCESSING SYSTEM

FIELD

The field relates generally to information processing systems, and more particularly to techniques for application program management in such information processing systems.

BACKGROUND

Enterprises (e.g., organizations, companies, groups, individuals, and the like) have a vested interest in keeping their application programs (also referred to herein simply as applications) operating properly. By way of example only, it is realized herein that incorrect exception handling can eventually cause an application (i.e., critical or the like) to crash or otherwise fail. An exception, in terms of software, is a fault or an undesired result or event affecting normal application program flow. By way of one example only, incorrect exception handling can result in adverse memory leaks. A memory leak refers to the gradual deterioration of the performance of the underlying computer system which may occur over time as the result of the fragmentation of the random access memory of the computer system. More particularly, memory leaks may be caused by incorrect exception handling or otherwise poorly designed/programmed applications that fail to free up memory segments when they are no longer needed.

Methods have been proposed to attempt to address such fault scenarios after the exception is thrown, i.e., reactive methods. However, such reactive methods are time-consuming as they typically require a significant amount of manual effort such as identifying the exception, triaging the exception, creating a task ticket, performing an analysis, fixing the exception, testing the fix, and then bringing the fix into the production system (i.e., the computer system in which the application is executed in real-time). This process can easily take two to three months in a large enterprise. Often times, however, these exceptions are simply logged and go unnoticed until the application fails to respond due to a crash.

SUMMARY

Illustrative embodiments provide application program management techniques in an information processing system environment.

For example, in one or more illustrative embodiments, a method comprises assessing an issue with an execution of a first application, by a second application, wherein the second application operates in association with the first application and comprises a reduced code set of the first application, and wherein the issue is assessed by the second application at least in part based on an artificial intelligence model trained on a context of the first application. The method further comprises generating, by the second application, a remedy for the issue based on the assessing.

Advantageously, illustrative embodiments provide for improved issue (e.g., exception) handling for an application executing in a production or other information processing system environment by providing a parallel application (e.g., referred to herein as an "application assistant" or an "application co-pilot") which is deployed and executes in the production system along with the application that the parallel application is assisting.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, processing systems comprising compute, storage and/or network resources, as well as other types of processing systems comprising various combinations of physical and/or virtual resources.

As mentioned, reactive methods exist to attempt to address exceptions. However, such reactive methods fall short because they are largely manual and time consuming in nature, and often times do not address exceptions before the application actually crashes. As such, there have been some industry efforts to develop so-called self-healing (automated) methods for exceptions. However, existing self-healing methods are not very effective in the current software industry as it is realized herein that each application behaves differently in different exception scenarios. A prediction of a code correction in accordance with existing self-healing or other existing automated methods (neural network-based), without knowing the context of the application process, the exception context, and the application behavior in the exception case, is risky to apply in a production system. Moreover, the current self-healing implementation is typically done within the application itself, which can overload the application and adversely impact real-time functionalities of the application.

For example, assume an application raises (throws) an exception for a specific request. An existing self-healing technique may catch and log the exception, and continue with the next request or try multiple times to continue and, if unable after some predetermined number of tries, stop the process. Thus, the exception will keep being raised each try (as the system is not fixing the cause but handling the symptom) and it will slowly consume memory and eventually bring down (crash) the application because of the memory leak condition.

Another existing implementation may include a generic exception reader and code corrector, e.g., based on neural networks or generative artificial intelligence. However, since each application likely has different behaviors, and since the code corrector does not have an application context and an exception context, automated implementation of the suggestion may not be accurate and can be considered risky, especially for critical applications in production systems.

Illustrative embodiments overcome the above-stated and other technical issues with existing exception handling approaches for an application executing in a production or other information processing system environment by providing a parallel application (e.g., referred to herein as an "application assistant" or an "application co-pilot") which is deployed and executes in the production system along with the application that the parallel application is assisting. The application assistant is configured to maintain various contexts associated with the application being assisted. For example, such contexts can include, but are not limited to, the intents and criticalities of the different services of the application being assisted, the behavior of each functional block of the application being assisted in response to requests made to the application, responses generated by the application being assisted, resource utilization at each service endpoint, and exception scenarios and behaviors associated with the application being assisted. The application assistant, as its name suggests, works in association with the application and continuously monitors the application's input, execution, output, exceptions, and behaviors. If anything goes wrong with the application, the application assistant uses artificial intelligence and knowledge base trained models for that application to find a best or otherwise suitable option to address the exception.

In some illustrative embodiments, an information processing system environment in which an application assistant operates may comprise a Kubernetes container orchestration system. Kubernetes is an open-source system for automating application deployment, scaling, and management within a container-based information processing system comprised of components referred to as pods, nodes and clusters. Types of containers that may be implemented or otherwise adapted within the Kubernetes system include, but are not limited to, Docker containers or other types of Linux containers (LXCs) or Windows containers.

In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster. A Kubernetes cluster is managed by at least one manager node. A Kubernetes environment may include multiple clusters respectively managed by multiple manager nodes. Furthermore, pods typically represent the respective processes (e.g., applications) running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Still further, pods may each have persistent storage volumes associated therewith. Configuration information (configuration objects) indicating how a container executes can be specified for each pod. It is to be appreciated, however, that embodiments are not limited to Kubernetes container orchestration techniques or the like.

Figure 1:
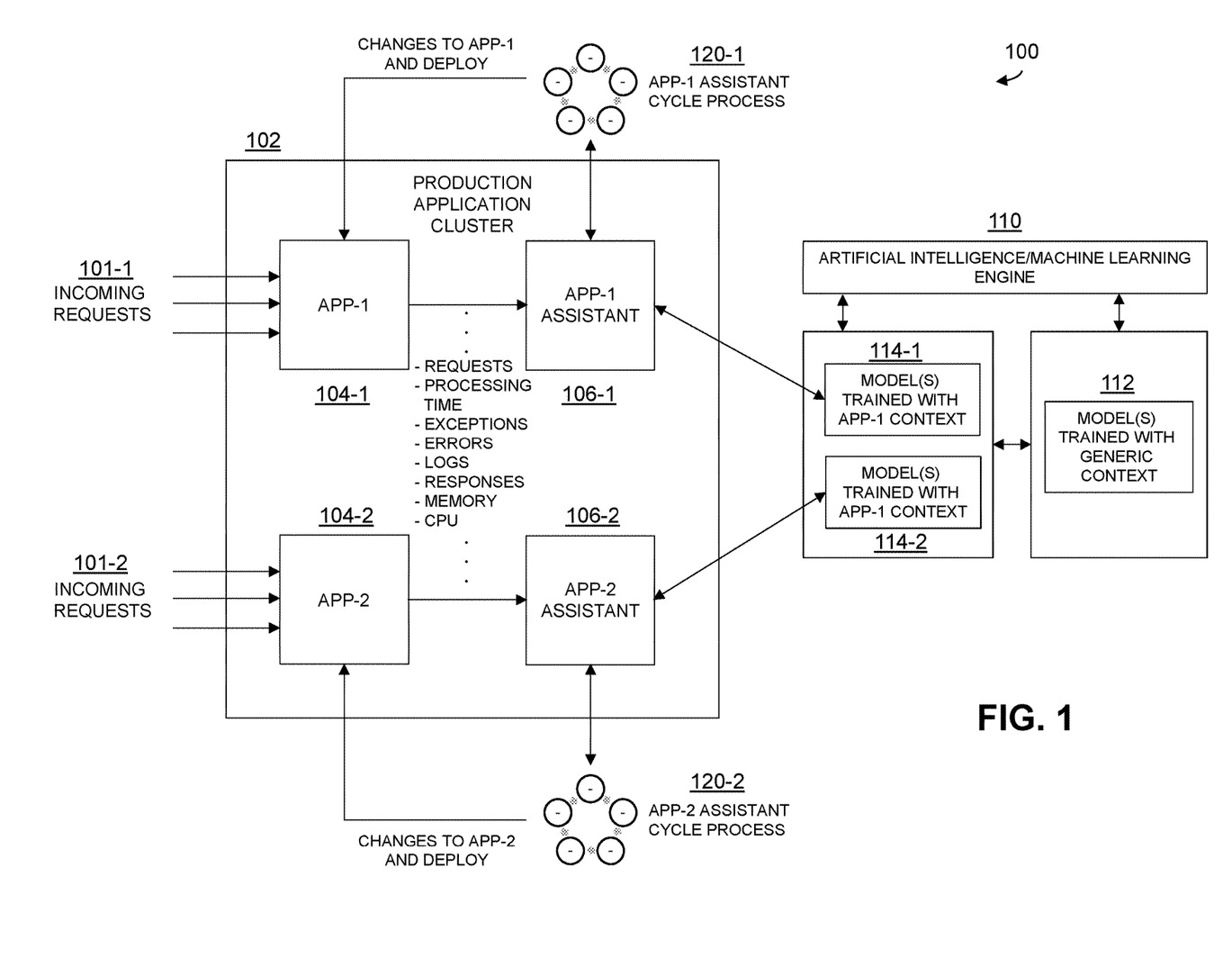
FIG. 1 illustrates an information processing system configured with application program management functionalities using an application assistant according to an illustrative embodiment.

Referring now to FIG. 1, an information processing system environment 100 configured with application program management functionalities using an application assistant according to an illustrative embodiment is shown. More particularly, as shown, two sets of incoming requests 101-1 and 101-2 are received at a production application cluster 102 and respectively provided to two applications 104-1 (APP-1) and 104-2 (APP-2) in production application cluster 102. By way of example, sets of incoming requests 101-1 and 101-2 are understood to be real-time requests (e.g., queries, inputs, etc.) to respective applications 104-1 and 104-2 as applications 104-1 and 104-2 execute as part of production application cluster 102. By way of example, production application cluster 102 may be part of a Kubernetes cluster, as mentioned above, in a production-level information processing system (e.g., production system).

Further, as shown, applications 104-1 and 104-2 respectively have application assistants 106-1 (APP-1 assistant) and 106-2 (APP-2 assistant) associated therewith. Each one of application assistants 106-1 and 106-2 (also referred to herein individually as application assistant 106 or collectively as application assistants 106) is deployed and executes in production application cluster 102 alongside (e.g., functionally in parallel with) its corresponding one of applications 104-1 and 104-2 (also referred to herein individually as application 104 or collectively as application 104).

Each application assistant 106 is configured to maintain various contexts associated with its corresponding application 104. In some examples, context may be, or otherwise derived from, a set of data used by a process (which may be a task, a thread, or a fiber) that is saved to allow a task to be interrupted, and later continued from the same point. In some other examples, context may be, or otherwise derived from, a set of actions taken, methods to invoke, variables to use, classes, functions, procedures, blocks of code, microservices, and the like (e.g., behaviors of a process).

Thus, the term "context" or "contexts" may broadly refer to information about some process, in this case, information about application 104. In some embodiments, context about application 104 can include, but is not limited to, information about input requests received by application 104 (including the input requests themselves), information about processing times associated with application 104 (including the processing times themselves), information about exceptions associated with application 104 (including the exceptions themselves), information about errors associated with application 104 (including the errors themselves), information about logs associated with application 104 (including the logs themselves), information about responses associated with application 104 (including the responses themselves), information about memory usage associated with application 104 (including the memory usage itself), information about processor (central processing unit or CPU) usage associated with application 104 (including the CPU usage itself), etc. Thus, each application assistant 106 works in parallel with its application 104 and continuously monitors input, execution, output, exceptions, behaviors, and the like, of application 104.

Still further, as shown, an artificial intelligence/machine learning (AI/ML) engine 110 manages a set of AI/ML models, i.e., one or more models 112 trained with a generic application context, one or more models 114-1 trained on context received from application assistant 106-1 for application 104-1, and one or more models 114-2 trained on context received from application assistant 106-2 for application 104-2. Models 114-1 and 114-2 are thus trained on specific knowledge bases respectively associated with applications 104-1 and 104-2, while model 112 is trained on a generic knowledge base associated with, for example, the application type of applications 104-1 and 104-2.

It is to be understood that models 114-1 and 114-2 are trained on their respective application contexts because applications 104-1 and 104-2 may need to be treated differently. For example, assuming an ArrayOutofBoundException occurs, application 104-1 may require overriding the exception, while application 104-2 may require stopping the process. Therefore, the application context specific to the given application is important to know for the given application assistant to cause the proper action to be taken. In contrast, model 112 can be trained on generic application behaviors that applications 104-1 and 104-2 have in common. In some embodiments, model 112 can be used when an exception is not handled through models 114-1 and 114-2 respectively trained through application contexts.

If any exception (or otherwise an error or some other anomaly or problem) occurs with a given one of applications 104, its corresponding application assistant 106 uses the artificial intelligence and knowledge base trained models (e.g., 112 and 114-1 or 114-2 depending on the corresponding application 104) for the given application 104 to find a best (e.g., optimal) or otherwise suitable (e.g., sub-optimal) solution to address the exception.

Additionally, as shown, application assistant 106-1 comprises a cycle process 120-1, while application assistant 106-2 comprises a cycle process 120-2. Each one of cycle processes 120-1 and 120-2 respectively implement a best or otherwise suitable solution determined in accordance with AI/ML engine 110 (and its models 112, 114-1 or 114-2) to address the exception. By way of example, cycle process 120-1 may generate a code change to application 104-1 and cause deployment of the code change in application 104-2, while cycle process 120-2 may generate a code change to application 104-2 and cause deployment of the code change in application 104-2. Further details of a cycle process (e.g., 120-1, 120-2) for an application assistant (e.g., 106-1, 106-2) will now be described below in accordance with FIG. 2.

Figure 2:
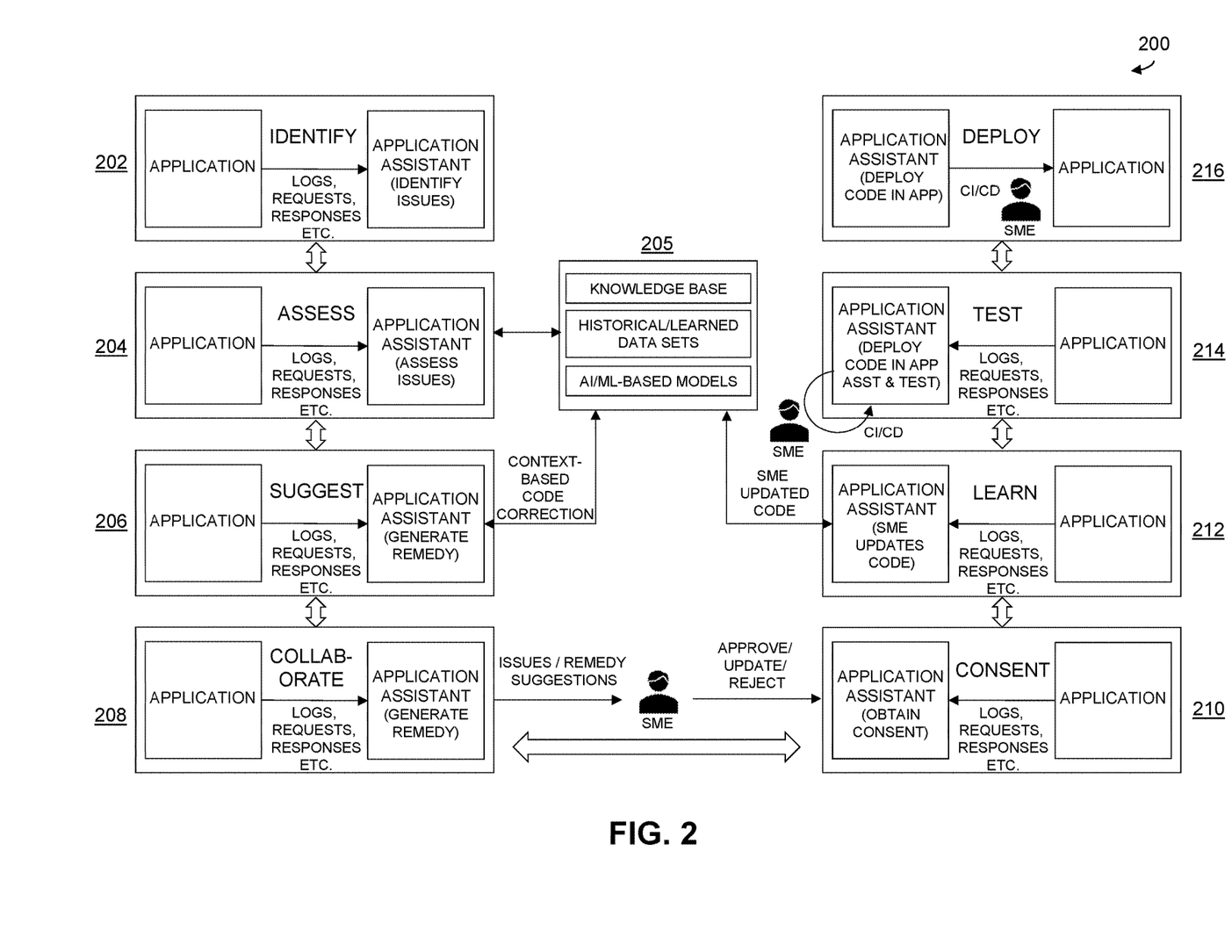
FIG. 2 illustrates a cycle process associated with an application assistant for use in application program management according to an illustrative embodiment.

FIG. 2 illustrates a cycle process 200 associated with an application assistant according to an illustrative embodiment. It is to be appreciated that cycle process 200 can be considered as an exemplary embodiment of each of cycle processes 120-1 and 120-2 in FIG. 1. More particularly, as mentioned, each application assistant 106 comprises an internal process for, inter alia, identifying a best or suitable action (remedy, solution, etc.) in the event of an exception and applying the action (e.g., code change) in accordance with its corresponding application 104.

As shown, in this illustrative embodiment, cycle process 200 comprises an identify step 202, an assess step 204, a suggest step 206, a collaborate step 208, a consent step 210, a learn step 212, a test step 214, and a deploy step 216.

In identify step 202, application assistant 106 identifies any issues specific to its corresponding application 104 based on exception logs, error logs, requests, responses, etc. obtained therefrom.

In assess step 204, application assistant 106 assesses the identified issues using a knowledge base, historical data set, a learned data set, and/or trained AI/ML models, e.g., models 112, 114-1 or 114-2, (collectively referenced as 205 in FIG. 2).

In suggest step 206, application assistant 106 generates a remedy for each issue based on assess step 204. Alternatively or additionally, application assistant 106 can utilize generative AI and/or neural network algorithms to generate one or more suggested remedies for the one or more issues. In one example, a remedy may comprise generation of a context-based code correction, i.e., program code that can be implemented in application 104 to address the one or more identified issues.

In collaborate step 208, application assistant 106 interacts with a subject matter expert or SME (which, e.g., can be an individual, a system, or some combination of both) to determine whether or not the one or more automatically generated remedies are acceptable.

In consent step 210, when the SME approves (consents to) the one or more suggested remedies, application assistant 106 has permission to proceed to cause deployment of the one or more suggested remedies.

In learn step 212, when the SME requires an update to any of the one or more suggested remedies or otherwise rejects any one or more of them, application assistant 106 continues to collaborate with the SME to generate one or more updated remedies (e.g., updated code correction(s)). The one or more updated remedies can then be provided to the knowledge base, historical data and models (i.e., collectively 205) to be used in step 204 for subsequent similar issues (e.g., future exceptions).

In test step 214, application assistant 106 tests the one or more remedies (e.g., code changes) internally so as not to impact application 104 while application 104 continues to execute in the production system.

In deploy step 216, application assistant 106 causes deployment of the one or more remedies in application 104.

It is to be appreciated that, in some illustrative embodiments, parts or all of test and deploy steps 214 and 216 can be performed by application assistant 106 in accordance with the SME and/or a continuous integration/continuous deployment (CI/CD) tool.

After the one or more remedies are deployed, cycle process 200 of application assistant 106 continues to monitor application 104, and steps 202 through 216 can be repeated as needed for addressing subsequent issues.

Figure 3:
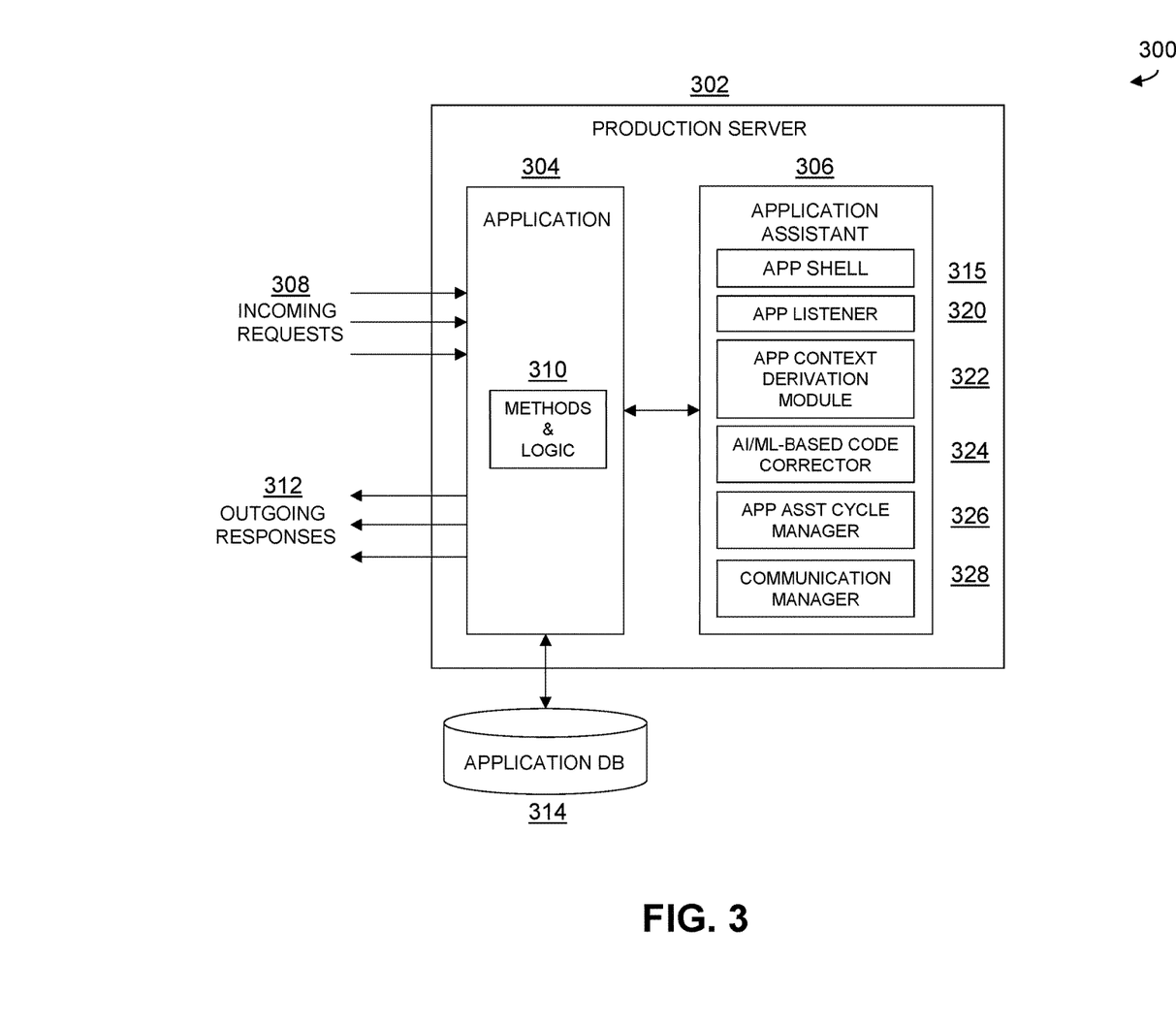
FIG. 3 illustrates an application assistant architecture for use in application program management according to an illustrative embodiment.

FIG. 3 illustrates an application assistant architecture 300 for use in application program management according to an illustrative embodiment. More particularly, as shown, a production server 302 comprises an application 304 and its corresponding application assistant 306. Application 304 receives incoming requests 308 (e.g., queries, inputs, etc.) and executes methods and logic 310 to generate outgoing responses 312 (e.g., query replies, outputs, etc.). Application 304 may also be operatively coupled to an application database (DB) 314 which can be local to, or remote from, production server 302. Application DB 314 is used by methods and logic 310 of application 304 to generate some or all of outgoing responses 312 in response to incoming requests 308.

As further shown, application assistant 306 comprises an application shell 315, an application listener 320, an application context derivation module 322, an AI/ML-based code corrector 324, an application assistant cycle manager 326, and a communication manager 328.

In some illustrative embodiments, application shell 315 is a stripped-out structure of application 304, i.e., a reduced code set of application 304. By way of example only with respect to methods and logic 310 of application 304, application shell 315 may comprise all the methods in the application class without implementation, and all the methods in the microservices with/without the business logic. Application shell 315 is used for testing corrected code (e.g., test step 214 in cycle process 200) without any data corruption impact on application 304 and production server 302.

More particularly, application listener 320 monitors and collects, e.g., incoming requests 308 and outgoing responses 312 of application 304, application behavior data, and usage data for the resources that application 304 used for each request to be processed.

Application context derivation module 322 identifies the exception (issue) and the variabilities (related information) at the time of the exception from application 304 and, using one or more AI/ML context-based trained models (e.g., models 114-1 or 114-2) as explained above, derives the context-powered code rectification suggestion (remedy or code correction).

AI/ML-based code corrector 324 generates the corrected code based on the identified exception, the application, and the method level context for a specific request. By way of example only, there can be three levels of code generation:
(i) Context-based code correction using a model trained with the application context (high confidence level suggestion);
(ii) Generic code correction such as AI generative pre-training transformer (GPT)-based code correction (medium to high confidence level suggestion); and/or
(iii) Generic code correction such as neural network-based code correction (low to medium confidence level suggestion).

Application assistant cycle manager 326 manages or otherwise controls a cycle process of application assistant 306 such as, for example, cycle process 200.

Communication manager 328 manages communications for application assistant 306 including, but not limited to, a hooks manager for external communication, an auto correction hooks manager for communication with application 304, and a hooks manager for communication with a CI/CD tool for validations and deployment.

It is to be appreciated that application context derivation module 322 is configured differently for different applications since different error states of each application behave differently. That is, application context derivation module 322 creates the context of the error condition of application 304 based on information such as, but not limited to: (i) an application name; (ii) a container/server; (iii) a class/method; (iv) contract fields that passed to the service at the time of the error or exception; (v) a type of exception; (vi) a number of the request at the time of error/exception; (vii) CPU/memory usage at the time of the exception; (viii) source code of the class; and (ix) a historical context identifier (ID), i.e., if other parameters match with the historical occurrence of the same error, that occurrence reference is obtained, which facilitates suggesting the corrections.

For example, when application 304 throws ArrayOutOfBoundException for the first time, application assistant 306 captures the above context details. Since there is no historical occurrence of this exception (i.e., the first time the exception occurs), no historical context ID is found. So, there is no knowledge base correction, learned correction, or historical correction that application assistant 306 can provide. Thus, application assistant 306 can suggest code using a generic code correction method (GPT or neural network). The new code is replaced in application shell 315 and tested, and passed to the SME (e.g., application owner or some other administrator) for approval. The SME can view and approve/update/reject the code. Once approved, a new historical context ID is generated for this code correction. Subsequently, when any similar error condition occurs, this context ID is referenced and a similar solution is suggested by application assistant 306.

Figure 4:
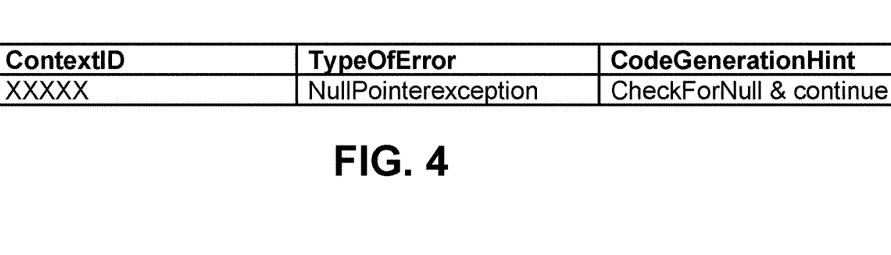
FIG. 4 illustrates an exemplary knowledge base associated with application program management using an application assistant according to an illustrative embodiment.

As explained above, AI/ML-based code corrector 324 is configured to provide knowledge base code generation. This can be pre-seeded in the system, as for a specific exception, with respect to how the application should behave. For example, in a NullPointerException case, some applications may need to stop execution and some applications may continue by reporting the error. FIG. 4 illustrates an exemplary knowledge base 402 for this exception scenario. The object that is getting the null pointer exception is checked and a code correction is generated.

In a learned remedy use case, assume the above-mentioned generated code correction is given approval before testing by application assistant 306. Assume further that the developer made some changes to the implementation to stop the execution. Now, application assistant 306 captures this and the next time any null pointer exception occurs, the code will be generated to stop the process (i.e., system-learned).

In a historical remedy use case, if there are no code generation suggestions (hints) in the knowledge base or learned database, then application assistant 306 searches for any historical remedies across the application type to generate the code.

If none of the above use cases apply, then application assistant 306 relies on generic AI models (GPT or neural network). For example, the context can be passed as a prompt along with the current source code, and a generic AI module generates the corrected code. Once approved, this solution becomes a learned remedy to serve a similar error reference in the future.

An exemplary implementation will now be described in accordance with FIGS. 5A through 5E which illustrate exemplary code associated with application program management using an application assistant according to an illustrative embodiment.

Figure 5A:
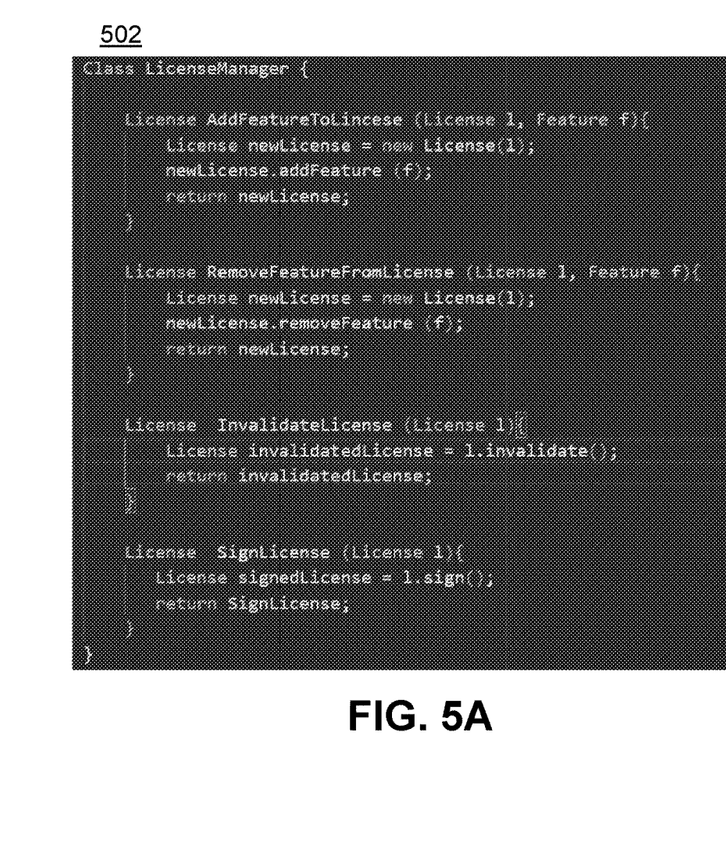
FIGS. 5A through 5E illustrate exemplary code associated with application program management using an application assistant according to an illustrative embodiment.
Figure 5B:
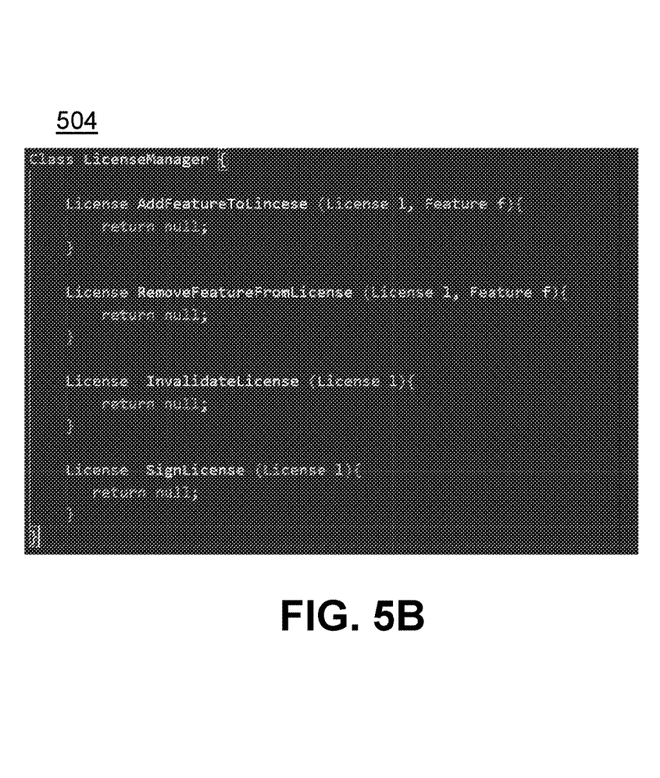

Code 502 in FIG. 5A represents a class LicenseManager in a given application (e.g., application 304) named DELP. As shown, all functions are exposed as services. Code 504 in FIG. 5B represents the corresponding application shell (e.g., application shell 315) for the corresponding application assistant (e.g., application assistant 306) with the same class and functions, but no implementation logic.

Figure 5C:
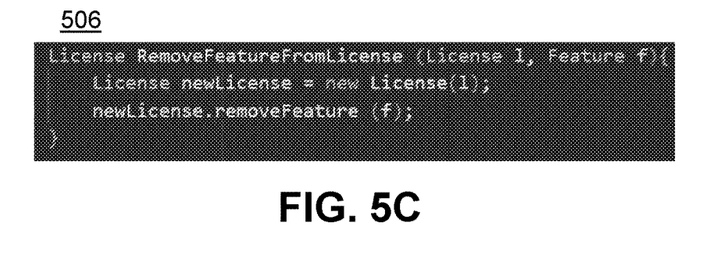

Recall the exemplary knowledge base 402 in FIG. 4. Assume that the application starts running in production and suddenly starts throwing the NullPointerException. The application assistant captures the error, and forms the context of the error/exception as:
(i) Application Name: DELP;
(ii) Container/Server: apm.dell.delp.com;
(iii) Class: LicenseManager;
(iv) Method: RemoveFeatureFromLicense;
(v) Contract Fields that passed to the service at the time of error or exception: Object: License, Object: Feature;
(vi) Type of Exception: NullPointerException;

(vii) Number of Request at the time of Error/Exception: 25;

(viii) CPU/Memory usage at the time of exception: 75%/52%;

(ix) Source code of the method, code 506 in FIG. 5C illustrates the source code of the method as a clob; and (x) Historical context ID: NULL (Generate new ContextID).

The application assistant checks the knowledge base and finds the hint is (CheckForNull & Continue). The application assistant generates the code based on the hint (e.g., a pre-determined code snippet). For example, pseudocode for the hint: CheckForNull & Continue can be as follows:

If Hint=="CheckForNull & Continue" {
  Get the Object causing the Null Pointer (from the log collected from application);
  Substring to get the Object Name (Here the Object Name is "newLicense");
  Generate Code to check the Object Null line before the exception line; and
  Complete the bracket.
}

Figure 5D:
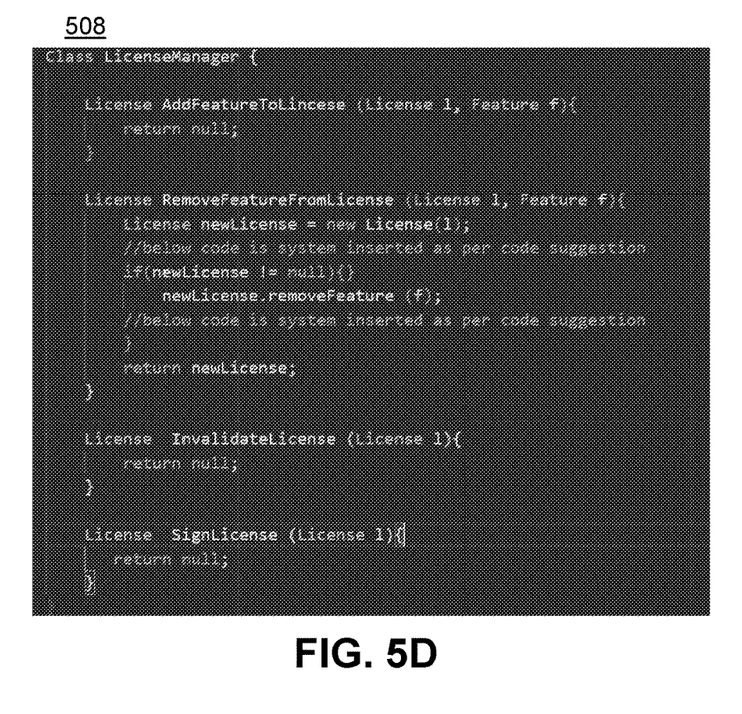

Thus, the generated code can be represented as code 508 in FIG. 5D.

Figure 5E:
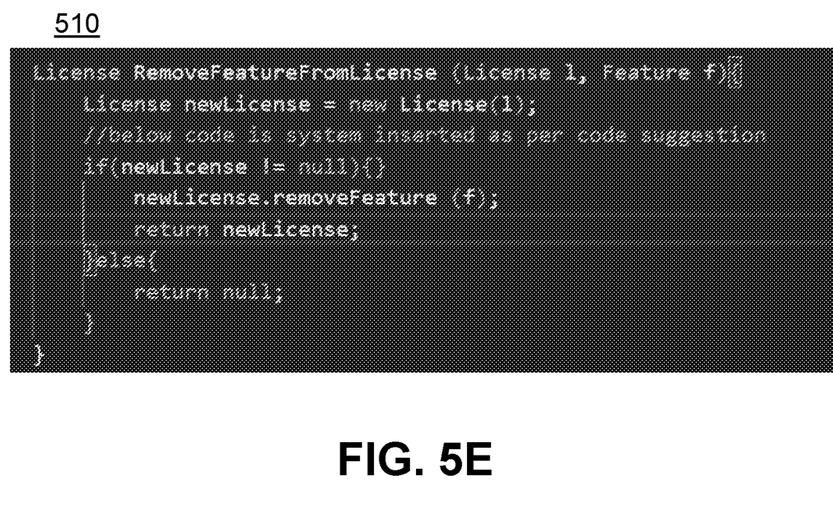

The generated code is replaced in the application assistant for the DELP application. CI/CD is applied to deploy the generated code in the application assistant. The SME can test the generated code using the application assistant without affecting the application. This new code is sent to the SME for approval. The SME can test the code in the application assistant. Assume the SME (e.g., an application owner) decides to change the suggestion and return "Null" (not a new License Object). As such, the suggested code is updated as shown in FIG. 5E as code 510.

Once approved, the application assistant enables the updated code to be tested by the SME. Then, once successfully tested, the updated code is promoted to production, i.e., deployed to the application. The updated code is also stored (e.g., 205 in FIG. 2) so that the next time the application gets a null pointer exception, this code structure will be used as a remedy.

To deploy the code in the application, the application assistant takes the changed code, obtains the application source code, replaces the new changed method, and pushes the updated source code to the CI/CD tool, which results in the updated source code for the application being auto-deployed and made ready to run in production with the appropriate fix.

Advantageously, illustrative embodiments provide an application assistant concept wherein, for a first application, a second application is deployed in parallel with the first application and wherein the second application:

(i) shadows activities in the first application;

(ii) maintains context(s) of the first application;

(iii) suggests remedies to issues, by way of example only, in an order such as: (1) knowledge base remedies, (2) learned remedies; (3) historical remedies; (4) generative AI remedies; and (6) neural network-based remedies;

(iv) collaborates with one or more SMEs (human, automated, or both) using a cycle process;

(v) allows an SME to test (e.g., unit test) for the change before promoting the change to the first application; and (vi) enables hot deployment to the first application to correct the problematic behavior (issue).

Figure 6:
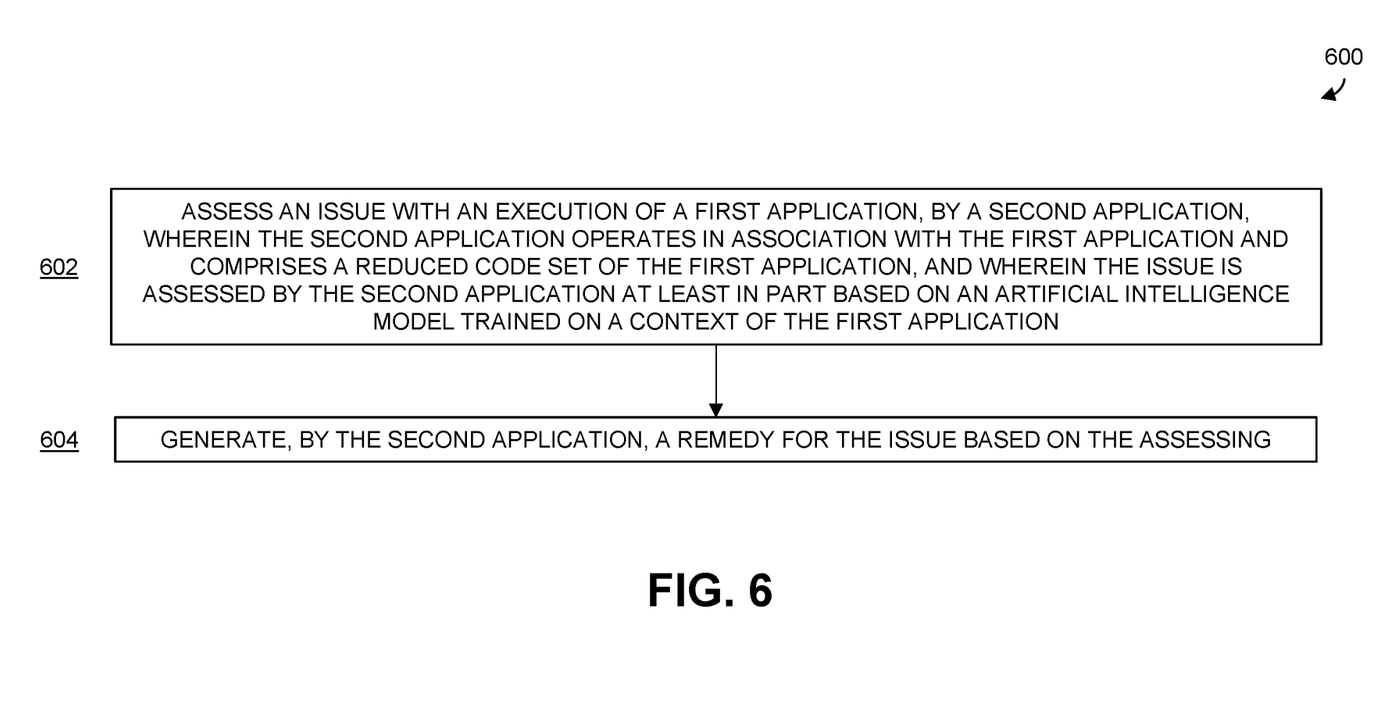
FIG. 6 shows a methodology for application program management using an application assistant according to an illustrative embodiment.

FIG. 6 shows a methodology 600 for application program management using an application assistant according to an illustrative embodiment. Step 602 assesses an issue with an execution of a first application, by a second application, wherein the second application operates in association with the first application and comprises a reduced code set of the first application, and wherein the issue is assessed by the second application at least in part based on an artificial intelligence model trained on a context of the first application. Step 604 generates, by the second application, a remedy for the issue based on the assessing.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for application program management using an application assistant will now be described in greater detail with reference to FIGS. 7 and 8. Although described in the context of information processing system environment mentioned herein, these platforms may also be used to implement at least portions of other information processing systems in other embodiments.

Figure 7:
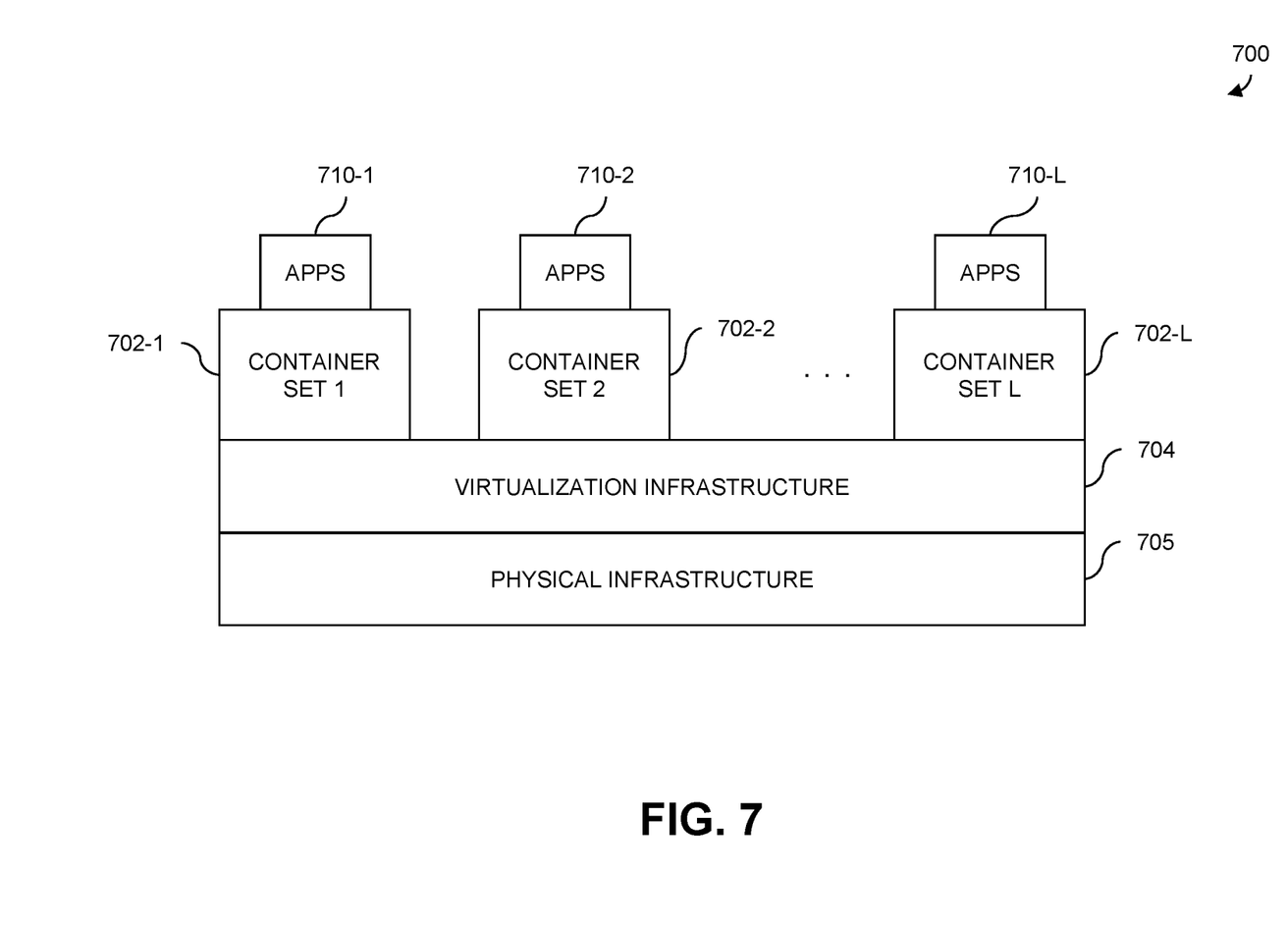
FIGS. 7 and 8 illustrate examples of processing platforms that may be utilized to implement at least a portion of an information processing system in illustrative embodiments.
Figure 8:
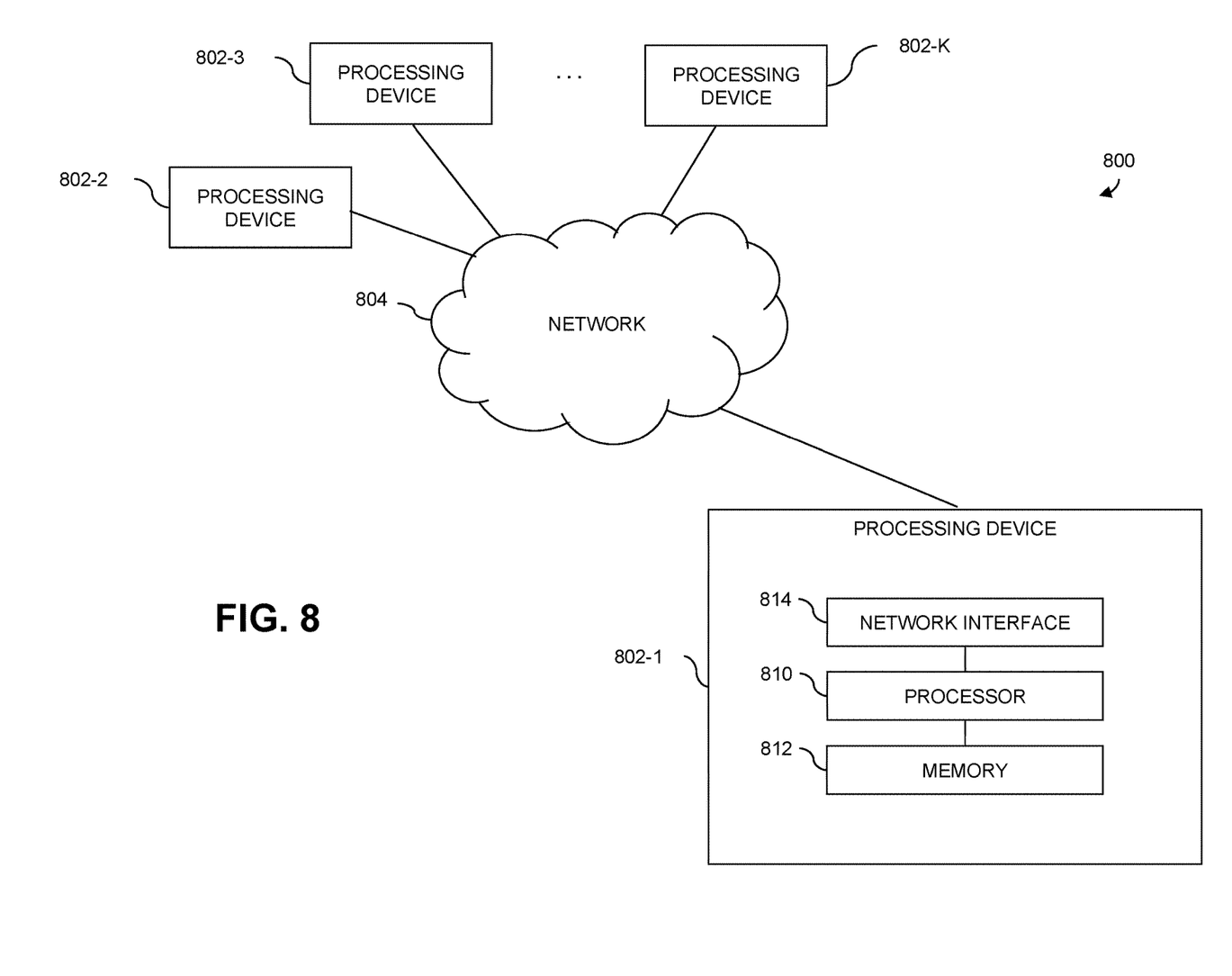

FIG. 7 shows an example processing platform comprising infrastructure 700. Infrastructure 700 comprises a combination of physical and virtual processing resources that may be utilized to implement at least a portion of the information processing system environment 100 in FIG. 1. Infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

Infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system environments mentioned herein may each run on a computer, server, storage device or other processing platform element. A given such element may be viewed as an example of what is more generally referred to herein as a "processing device." Infrastructure 700 shown in FIG. 7 may represent at least a portion of one processing platform. Another example of such a processing platform is processing platform 800 shown in FIG. 8.

The processing platform 800 in this embodiment comprises at least a portion of information processing system environment 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and information processing system environments mentioned herein may include additional or alternative processing platforms, as well as numerous distinct processing platforms in any combination, with each such platform comprising one or more computers, servers, storage devices or other processing devices. For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for application monitoring with predictive anomaly detection and fault isolation as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, edge computing environments, applications, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

assessing an exception issue with an execution of a first application, by a second application, wherein the second application operates in parallel with the first application and comprises application-specific data of the first application including an application shell of the first application, application-specific context data of the first application, and application-specific exception data of the first application, and wherein the exception issue is assessed by the second application at least in part by:

continuously monitoring the first application and, wherein the exception issue with the execution of the first application is detected by the second application, identifying an exception issue type of the exception issue with the execution of the first application;

creating a context of the exception issue with the execution of the first application based on the identified exception issue type using application state information of the first application at the time of the exception issue with the execution of the first application; and inputting the identified exception issue type and the created context of the exception issue with the execution of the first application into an artificial intelligence model of the second application, wherein the artificial intelligence model of the second application is trained on a plurality of contexts of the first application to customize the artificial intelligence model of the second application to exception protocols of the first application;

generating, by the artificial intelligence model of the second application, an application-specific remedy for the exception issue based on the identified exception issue type and the created context of the exception issue with the execution of the first application, the application-specific remedy for the exception issue comprising a context-based code correction to correct the exception issue with the execution the first application;

testing the generated application-specific remedy for the exception issue by applying the context-based code correction to the application shell of the second application to determine if the exception issue is corrected with the context-based code correction; and pushing the generated application-specific remedy for the exception issue to the first application upon a positive result of the testing of the generated application-specific remedy in the application shell of the second application;

wherein the method is performed in accordance with a processing device comprising a processor operatively coupled to a memory and configured to execute program code.

2. The method of claim 1, wherein the application state information of the first application is collected from the first application and comprises one or more of: information associated with a behavior of functions of the first application; information associated with a behavior of the exception issue with the execution of the first application; and information associated with resource utilization for the execution of the first application.

3. The method of claim 1, wherein assessing the exception issue with the execution of the first application further comprises utilizing another artificial intelligence model of the second application trained on a generic context of an application type for the first application.

4. The method of claim 1, wherein assessing the exception issue with the execution of the first application further comprises utilizing a knowledge base for the first application.

5. The method of claim 1, wherein assessing the exception issue with the execution of the first application further comprises utilizing a historical data set for the first application.

6. The method of claim 1, wherein assessing the exception issue with the execution of the first application further comprises utilizing a learned data set for the first application.

7. The method of claim 1, further comprising storing the generated application-specific remedy for use in assessing a subsequent exception issue with the execution of the first application.

8. The method of claim 1, further comprising collaborating, by the second application, with a subject matter expert to one of approve, reject or update the generated application-specific remedy generated for the first application.

9. The method of claim 1, wherein the context-based code correction of the generated application-specific remedy comprises corrected code generated for deployment in the first application to affect subsequent handling of the exception issue by the first application.

10. An apparatus comprising:

at least one processing platform comprising at least one processor coupled to at least one memory, configured to:

assess an exception issue with an execution of a first application, by a second application, wherein the second application operates in parallel with the first application and comprises application-specific data of the first application including an application shell of the first application, application-specific context data of the first application, and application-specific exception data of the first application, and wherein the exception issue is assessed by the second application at least in part by:

continuously monitoring the first application and, wherein the exception issue with the execution of the first application is detected by the second application, identifying an exception issue type of the exception issue with the execution of the first application;

creating a context of the exception issue with the execution of the first application based on the identified exception issue type using application state information of the first application at the time of the exception issue with the execution of the first application; and inputting the identified exception issue type and the created context of the exception issue with the execution of the first application into an artificial intelligence model of the second application, wherein the artificial intelligence model of the second application is trained on a plurality of contexts of the first application to customize the artificial intelligence model of the second application to exception protocols of the first application;

generate, by the artificial intelligence model of the second application, an application-specific remedy for the exception issue based on the identified exception issue type and the created context of the exception issue with the execution of the first application, the application-specific remedy for the exception issue comprising a context-based code correction to correct the exception issue with the execution the first application;

test the generated application-specific remedy for the exception issue by applying the context-based code correction to the application shell of the second application to determine if the exception issue is corrected with the context-based code correction; and push the generated application-specific remedy for the exception issue to the first application upon a positive result of the testing of the generated application-specific remedy in the application shell of the second application.

11. The apparatus of claim 10, wherein the application state information of the first application is collected from the first application and comprises one or more of: information associated with a behavior of functions of the first application; information associated with a behavior of the exception issue with the execution of the first application; and information associated with resource utilization for the execution of the first application.

12. The apparatus of claim 10, wherein assessing the exception issue with the execution of the first application further comprises utilizing one or more of: another artificial intelligence model of the second application trained on a generic context of an application type for the first application; a knowledge base for the first application; a historical data set for the first application; and a learned data set for the first application.

13. The apparatus of claim 10, wherein the processing platform is further configured to store the generated application-specific remedy for use in assessing a subsequent issue with the execution of the first application.

14. The apparatus of claim 10, wherein the processing platform is further configured to collaborate, by the second application, with a subject matter expert to one of approve, reject or update the generated application-specific remedy generated for the first application.

15. A computer program product comprising a non-transitory processor-readable storage medium having stored therein program code of one or more software programs, wherein the program code when executed by at least one processing device causes the at least one processing device to:

assess an exception issue with an execution of a first application, by a second application, wherein the second application operates in parallel with the first application and comprises application-specific data of the first application including an application shell of the first application, application-specific context data of the first application, and application-specific exception data of the first application, and wherein the exception issue is assessed by the second application at least in part by:

continuously monitoring the first application and, wherein the exception issue with the execution of the first application is detected by the second application, identifying an exception issue type of the exception issue with the execution of the first application;

creating a context of the exception issue with the execution of the first application based on the identified exception issue type using application state information of the first application at the time of the exception issue with the execution of the first application; and inputting the identified exception issue type and the created context of the exception issue with the execution of the first application into an artificial intelligence model of the second application, wherein the artificial intelligence model of the second application is trained on a plurality of contexts of the first application to customize the artificial intelligence model of the second application to exception protocols of the first application;

generate, by the artificial intelligence model of the second application, an application-specific remedy for the exception issue based on the identified exception issue type and the created context of the exception issue with the execution of the first application, the application-specific remedy for the exception issue comprising a context-based code correction to correct the exception issue with the execution the first application;

test the generated application-specific remedy for the exception issue by applying the context-based code correction to the application shell of the second application to determine if the exception issue is corrected with the context-based code correction; and push the generated application-specific remedy for the exception issue to the first application upon a positive result of the testing of the generated application-specific remedy in the application shell of the second application.

16. The apparatus of claim 10, wherein the context-based code correction of the generated application-specific remedy comprises corrected code generated for deployment in the first application to affect subsequent handling of the exception issue by the first application.

17. The computer program product of claim 15, wherein the application state information of the first application is collected from the first application and comprises one or more of: information associated with a behavior of functions of the first application; information associated with a behavior of the exception issue with the execution of the first application; and information associated with resource utilization for the execution of the first application.

18. The computer program product of claim 15, wherein assessing the exception issue with the execution of the first application further comprises utilizing another artificial intelligence model of the second application trained on a generic context of an application type for the first application.

19. The computer program product of claim 15, wherein assessing the exception issue with the execution of the first application further comprises utilizing a knowledge base for the first application.

20. The computer program product of claim 15, wherein assessing the exception issue with the execution of the first application further comprises utilizing a historical data set for the first application.

* * * * *